United States Patent
Li et al.

(10) Patent No.: US 10,006,517 B2
(45) Date of Patent: Jun. 26, 2018

(54) TORSIONAL VIBRATION DAMPER WITH PLANETARY GEAR ENHANCED BY INERTIAL MASS

(71) Applicant: GM Global Technology Operations LLC, Detroit, MI (US)

(72) Inventors: Dongxu Li, Troy, MI (US); Kumaraswamy V. Hebbale, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 359 days.

(21) Appl. No.: 15/060,129

(22) Filed: Mar. 3, 2016

(65) Prior Publication Data
US 2017/0254385 A1    Sep. 7, 2017

(51) Int. Cl.
*F16F 15/12*    (2006.01)
*F16F 15/123*    (2006.01)
*F16H 45/02*    (2006.01)

(52) U.S. Cl.
CPC ...... *F16F 15/1206* (2013.01); *F16F 15/1232* (2013.01); *F16H 45/02* (2013.01); *F16H 2045/0268* (2013.01)

(58) Field of Classification Search
CPC .............................. F16F 15/1206; F16H 45/02
See application file for complete search history.

(56) References Cited

U.S. PATENT DOCUMENTS

| | | | |
|---|---|---|---|
| 2,855,802 A | 10/1958 | Gorsky | |
| 2,995,956 A | 6/1961 | Moore | |
| 4,252,226 A | 2/1981 | Staub | |
| 4,291,790 A | 9/1981 | Staub | |
| 4,398,436 A | 8/1983 | Fisher | |
| 4,573,374 A | 3/1986 | Koshimo et al. | |
| 4,676,121 A | 6/1987 | Kouno | |
| 4,800,996 A | 1/1989 | Loizeau | |
| 5,551,928 A | 9/1996 | Sudau | |
| 5,634,866 A | 6/1997 | Sudau | |
| 5,713,813 A | 2/1998 | von Greyerz | |

(Continued)

FOREIGN PATENT DOCUMENTS

| | | |
|---|---|---|
| DE | 3139658 A1 | 4/1983 |
| DE | 3423210 A1 | 4/1985 |

(Continued)

*Primary Examiner* — Derek D Knight (57) ABSTRACT

A torsional vibration damper includes a planetary gear set having a ring gear connected to a transmission input shaft, a carrier rotatably supporting multiple planet gears individually meshed with a sun gear, and with the ring gear meshed with the planet gears. A spring cage includes a first spring support member having: a member first leg fixed to the ring gear; a member second leg rotatably connected to the transmission input shaft; and multiple first spring support member elements. A second spring support member connected to the carrier, the second spring support member having multiple second spring support member elements. Multiple springs each spring have at least one of the first spring support member elements and one of the second spring support member elements in contact with opposed ends of the spring. An inertial mass member is connected to the sun gear at a first end and has an inertial mass connected at a second end.

20 Claims, 5 Drawing Sheets

(56) References Cited

U.S. PATENT DOCUMENTS

| | | |
|---|---|---|
| 5,716,300 A | 2/1998 | Sammataro et al. |
| 5,733,218 A | 3/1998 | Sudau et al. |
| 5,735,768 A | 4/1998 | Sudau |
| 5,766,109 A | 6/1998 | Sudau |
| 5,816,973 A | 10/1998 | Sudau et al. |
| 5,836,217 A | 11/1998 | Sudau et al. |
| 5,863,274 A | 1/1999 | Jackel |
| 5,878,856 A | 3/1999 | Sudau et al. |
| 5,967,939 A | 10/1999 | Reik et al. |
| 5,976,048 A | 11/1999 | Sudau et al. |
| 6,003,650 A | 12/1999 | Kleifges |
| 6,019,663 A | 2/2000 | Sudau |
| 6,058,801 A | 5/2000 | Schierling et al. |
| 6,058,802 A | 5/2000 | Sudau et al. |
| 6,099,434 A | 8/2000 | Sasse et al. |
| 6,102,174 A | 8/2000 | Sasse |
| 6,126,568 A * | 10/2000 | Sudau ............... F16H 45/02 192/212 |
| 6,200,222 B1 | 3/2001 | Sudau |
| 6,230,862 B1 | 5/2001 | Reik et al. |
| 6,231,472 B1 | 5/2001 | Sudau et al. |
| 6,354,974 B1 | 3/2002 | Kozarekar |
| 6,398,655 B1 | 6/2002 | Orlamunder et al. |
| 6,435,998 B1 | 8/2002 | Sudau et al. |
| 6,439,362 B2 | 8/2002 | Reik et al. |
| 6,591,705 B1 | 7/2003 | Reik et al. |
| 6,695,109 B2 | 2/2004 | Wack et al. |
| 6,758,315 B2 | 7/2004 | Bauer et al. |
| 6,799,665 B1 | 10/2004 | Sasse et al. |
| 6,832,672 B2 | 12/2004 | Bauer et al. |
| 6,887,180 B2 | 5/2005 | Pels et al. |
| 6,962,533 B2 | 11/2005 | Zottmann et al. |
| 7,073,646 B2 | 7/2006 | Sasse et al. |
| 7,108,626 B2 | 9/2006 | Friedmann |
| 7,114,565 B2 | 10/2006 | Man et al. |
| 7,143,879 B2 | 12/2006 | Ackermann et al. |
| 7,261,665 B2 | 8/2007 | Friedmann et al. |
| 7,267,212 B2 | 9/2007 | Wack et al. |
| 7,287,634 B2 | 10/2007 | Agner et al. |
| 7,484,607 B2 | 2/2009 | Schneider et al. |
| 7,523,817 B2 | 4/2009 | Forster |
| 7,530,223 B2 | 5/2009 | Ender et al. |
| 7,604,542 B2 | 10/2009 | Bach et al. |
| 7,648,009 B2 | 1/2010 | Wack et al. |
| 7,651,399 B2 | 1/2010 | Wack |
| 7,662,043 B2 | 2/2010 | Schmid et al. |
| 7,743,900 B2 | 6/2010 | Breier |
| 7,993,204 B2 | 8/2011 | Dogel |
| 8,075,410 B2 | 12/2011 | Carlson et al. |
| 8,313,385 B2 | 11/2012 | Mundt et al. |
| 9,316,299 B2 * | 4/2016 | Doegel ............... F16H 35/00 |
| 9,856,958 B2 * | 1/2018 | Basin ............... F16H 45/02 |
| 2010/0216555 A1 | 8/2010 | Le Moal |
| 2011/0143843 A1 | 6/2011 | Yamamoto et al. |
| 2013/0068580 A1 * | 3/2013 | Doegel ............... F16F 15/1478 192/3.28 |
| 2013/0269475 A1 | 10/2013 | Le Moal |
| 2014/0047949 A1 * | 2/2014 | Lorenz ............... F16F 15/13157 74/664 |
| 2014/0162834 A1 | 6/2014 | Dogel et al. |
| 2015/0072822 A1 * | 3/2015 | Swank ............... F16H 45/02 475/59 |

FOREIGN PATENT DOCUMENTS

| | | |
|---|---|---|
| DE | 3630398 A1 | 5/1987 |
| DE | 3612583 A1 | 10/1987 |
| DE | 3624496 A1 | 1/1988 |
| DE | 3624498 A1 | 1/1988 |
| DE | 3834284 A1 | 4/1990 |
| DE | 3926384 A1 | 2/1991 |
| DE | 3934798 A1 | 4/1991 |
| DE | 4121586 A1 | 1/1993 |
| DE | 4128868 A1 | 3/1993 |
| DE | 4333562 A1 | 4/1994 |
| DE | 4444196 A1 | 6/1995 |
| DE | 19514411 A1 | 11/1995 |
| EP | 0041708 A2 | 12/1981 |
| EP | 0086044 A1 | 8/1983 |
| EP | 0533426 A2 | 3/1993 |
| FR | 2782766 A1 | 3/2000 |
| GB | 2220464 A | 10/1990 |
| GB | 2285109 A | 6/1995 |
| GB | 2292596 A | 2/1996 |
| GB | 2320534 A | 6/1998 |
| WO | WO2006082455 A1 | 8/2006 |

* cited by examiner

TORSIONAL VIBRATION DAMPER WITH PLANETARY GEAR ENHANCED BY INERTIAL MASS

FIELD

The present disclosure relates to a torsional vibration damper or isolator, and more particularly to a powertrain having a planetary gear set incorporated into a vibration damper and enhanced using an inertial mass in order to reduce torsional vibration between an output of an engine and an input of a transmission.

BACKGROUND

The statements in this section merely provide background information related to the present disclosure and may or may not constitute prior art.

Motor vehicle engines produce torsional vibration that is undesirable to transmit through the powertrain and driveline to the motor vehicle. Typically, a torsional isolator or damper is used to isolate or reduce the torsional vibration transmitted from the engine to the transmission. The torsional damper can be placed within a torque converter between a torque converter lock up clutch and an input shaft of the transmission. Known torsional dampers use one or more springs to store energy and to dampen an energy transfer path between the engine and the transmission. However, in certain powertrain configurations such as in engines which have or temporarily operate fewer than four pistons, known torsional dampers are insufficient to isolate the torsional vibrations given the design space. For example, in engines using rolling cylinder deactivation strategy, and in engines which may be temporarily operating as few as two pistons, a substantial increase in vibrational magnitude and periodic torque amplitude occur which known spring design vibration dampers are insufficient to isolate, thereby requiring improvement over known vibration dampers.

Accordingly, there is room in the art for a powertrain having a vibration damper that reduces torsional vibration over a broad range of vibrational frequencies.

SUMMARY

The present disclosure provides an example of a torsional vibration damper for a motor vehicle. The torsional vibration damper includes a planetary gear set including a first member, a second member, and a third member connected to a transmission input shaft. A spring cage includes a first spring support member and multiple first spring support member elements. A second spring support member is connected to the second member of the planetary gear set, the second spring support member having multiple second spring support member elements. Multiple springs each have at least one of the first spring support member elements and one of the second spring support member elements in contact with each opposite end of the springs. An inertial mass member is connected to the first member of the planetary gear set.

In one example of the torsional vibration damper for a motor vehicle of the present disclosure, the first spring support member includes a member first leg fixed to the third member of the planetary gear set.

In yet another example of the torsional vibration damper for a motor vehicle of the present disclosure, the first spring support member includes a member second leg rotatably connected to the transmission input shaft.

In yet another example of the torsional vibration damper for a motor vehicle of the present disclosure, the inertial mass member is connected to the first member at a first end and includes an inertial mass connected at a second end, the inertial mass member and the inertial mass positioned between the member first leg and the member second leg of the first spring support member.

In yet another example of the torsional vibration damper for a motor vehicle of the present disclosure, the inertial mass member is connected to the first member at a first end and includes an inertial mass connected at a second end, and wherein the inertial mass member and the inertial mass are positioned between the member second leg of the first spring support member and the second spring support member.

In yet another example of the torsional vibration damper for a motor vehicle of the present disclosure, the first member of the planetary gear set defines a sun gear, the second member of the planetary gear set defines a carrier, and the third member of the planetary gear set defines a ring gear, and the inertial mass is spaced freely away from the sun gear at a distance maximized from a longitudinal central axis of the transmission input shaft.

In yet another example of the torsional vibration damper for a motor vehicle of the present disclosure, the carrier is connected to the transmission input shaft, and the carrier is also coupled to the ring gear.

In yet another example of the torsional vibration damper for a motor vehicle of the present disclosure, the ring gear is connected to the transmission input shaft, and the ring gear is also coupled to the carrier.

In yet another example of the torsional vibration damper for a motor vehicle of the present disclosure, the ring gear and the first spring support member rotate with respect to the transmission input shaft and the planetary gear set, and the ring gear is restrained in an arc of rotation with respect to the second spring support member by compression and expansion of the springs.

In yet another example of the torsional vibration damper for a motor vehicle of the present disclosure, the inertial mass member is connected to the first member at a first end and includes an inertial mass connected at a second end, and wherein the second end of the inertial mass member and the inertial mass are positioned proximate to the springs.

In yet another example of the torsional vibration damper for a motor vehicle of the present disclosure, the first member of the planetary gear set defines a ring gear, the second member of the planetary gear set defines a carrier, and the third member of the planetary gear set defines a sun gear.

In yet another example of the torsional vibration damper for a motor vehicle of the present disclosure, the carrier is connected to the transmission input shaft, and the carrier is also coupled to the sun gear.

In yet another example of the torsional vibration damper for a motor vehicle of the present disclosure, the sun gear is connected to the transmission input shaft, and the carrier is also coupled to the sun gear.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
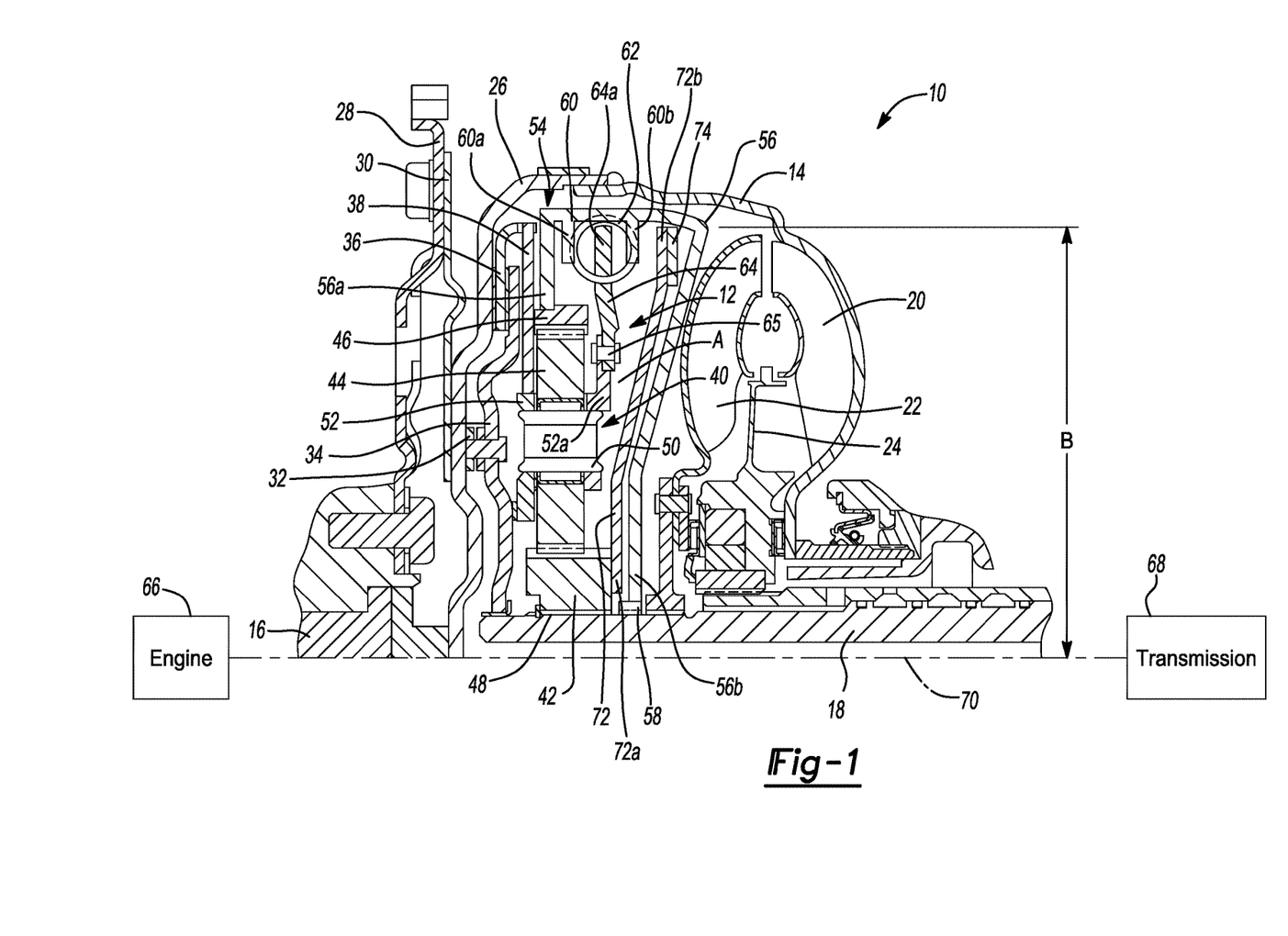
FIG. 1 is a cross sectional front elevational view of a motor vehicle torsional vibration damper system according to the principles of the present disclosure.

With reference to FIG. 1, a transmission-drive system 10 for a motor vehicle includes a torsional vibration damper 12 positioned within a torque converter assembly 14. The torsional vibration damper 12 isolates engine torque pulsations between an engine drive component 16 and a transmission input shaft 18.

The torque converter assembly 14 generally includes a pump 20, a turbine 22, and a stator 24 positioned within a torque converter housing 26. The pump 20 is coupled to the torque converter housing 26 and driven by the engine drive component 16 such as a crank shaft. The turbine 22 is fluidly driven by rotation of the pump 20. The stator 24 is located between the pump 20 and the turbine 22 and is used to multiply torque within the torque converter assembly 14. The torque converter housing 26 is flexibly connected to an engine interface 28, for example by fasteners through a flex plate 30. The torque converter assembly 14 also includes a lock-up clutch 32 that is operable to selectively mechanically couple the pump 20 to the turbine 22 using a lock-up clutch piston or pressure plate 34 connected to a lock-up clutch plate 36. The input to the torsional vibration damper 12 is provided through a connection plate 38 fixed to the lock-up clutch plate 36.

The torsional vibration damper 12 is coupled between the connection plate 38 and the transmission input shaft 18 in order to reduce torsional vibration in a path between the engine drive component 16 and the transmission shaft 18 when the torque converter lockup clutch 32 is closed via the lock-up clutch plate 36. To increase the effective range of torsional vibration damping, the torsional vibrational damper 12 includes a planetary gear set 40. Components of the planetary gear set 40 include a sun gear 42, multiple pinion gears 44, and a ring gear 46.

The sun gear 42 freely rotates on a bearing 48 on the transmission input shaft 18. The multiple pinion gears 44 individually rotating about the sun gear 42 each have external gear teeth meshing with external gear teeth of the sun gear 42. The external gear teeth of each of the pinion gears 44 are also meshed to internal gear teeth of the ring gear 46 which is positioned having the pinion gears 44 internal to the ring gear 46. The pinion gears 44 are individually rotatably mounted to separate pinion shafts 50 that are connected to a carrier 52. According to several aspects, the torsional vibrational damper 12 in the torque converter assembly 14 is connected to the transmission input shaft 18, and the torsional vibrational damper 12 absorbs engine drive component vibration as the torque converter assembly 14 transfers power from the engine drive component 16 to rotate the transmission input shaft 18. The connection plate 38 and thereby the lock-up clutch plate 36 are connected to the carrier 52 thereby providing input to the planetary gear set 40.

The torsional vibration damper 12 includes a spring cage 54 having a first spring support member 56 including a member first leg 56a fixed to the ring gear 46 and a member second leg 56b connected to the transmission input shaft 18 by splines defining a spline gear 58. The first spring support member 56 includes multiple first spring support elements 60, which according to several aspects each include a first spring support element first portion 60a and a first spring support element second portion 60b. The torsional vibration damper 12 also includes multiple springs 62 (only one of which is visible in this view) such as coiled compression springs, each spring 62 contacted at opposite ends by one each of the first spring support element first and second portions 60a, 60b. The spring cage 54 further includes a second spring support member 64 which is connected to a portion 52a of the carrier 52 for example using multiple fasteners 65 such as rivets. The second spring support member 64 includes multiple second spring support member elements 64a which individually directly contact opposite ends of each of the springs 62. Axial rotation of the first spring support member 56 with respect to the second spring support member 64 compresses the springs 62.

As previously noted, the first spring support member 56 is connected to the ring gear 46. The second spring support member 64 is connected to the carrier 52 which as previously noted rotatably supports the pinion gears 44. Because the ring gear 46 and therefore the first spring support member 56 rotate with respect to the transmission input shaft 18 and the planetary gear set 40, the ring gear 46 is restrained in its arc of rotation with respect to the second spring support member 64 by compression and expansion of the springs 62. The ring gear 46 is connected to and drives the transmission input shaft 18, therefore torque from an engine 66 is transferred through the torsional vibration damper 12 and the transmission input shaft 18 to a transmission 68 when the torque converter clutch is closed. The transmission input shaft 18 and the torsional vibration damper 12 including the planetary gear set 40 coaxially rotate with respect to a longitudinal central axis 70 of the transmission input shaft 18. Torsional vibration reduction is achieved in part by compression of the springs 62, which store the energy received by angular rotation between the first spring support member 56 and the second spring support member 64.

According to several aspects, the torsional vibration damper 12 further includes an inertial mass member 72 defining a disc or plate positioned within a space "A" defined by the first spring support member 56 second leg 56b and the second spring support member 64. The inertial mass member 72 is connected to the sun gear 42 at a first end 72a and therefore directly co-rotates together with the sun gear 42. An inertial mass 74 is fixed to a second end 72b of the inertial mass member 72 and according to several aspects is spaced freely away from the sun gear 42 at a maximum extent of the inertial mass member 72. According to several aspects the second end 72b and the inertial mass 74 are positioned proximate to the springs 62, and at a distance "B" which is maximized from the longitudinal central axis 70 of the transmission input shaft 18 provided within the first spring support member 56.

Referring to FIG. 2, and again to FIG. 1, the transmission-drive system 10 is illustrated in a three node lever diagram format. A lever diagram is a schematic representation of the components of a mechanical device such as meshing gear sets or planetary gear sets. Each individual lever represents a planetary gear set or meshed gear pair. The three basic mechanical components of the planetary gear are each represented by a node while the gear pairs are represented by a node and the rotation change represented by a node fixed to ground. Therefore, a single lever contains three nodes. In a planetary gear set, one node represents the sun gear, one the planet gear carrier, and one the ring gear. In a meshed gear pair, one node represents a first gear, one a second gear, and the third the rotational direction change between the meshed gears.

In some cases, two levers may be combined into a single lever having more than three nodes, and typically four nodes. For example, if two nodes on two different levers are connected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or connections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

Figure 2:
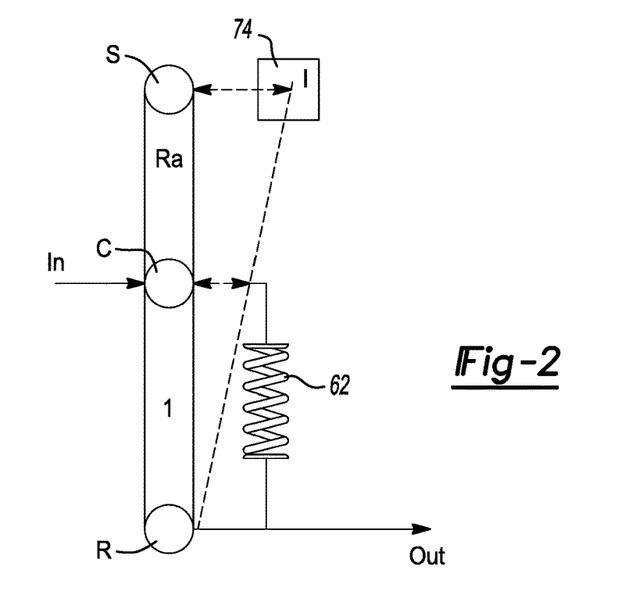
FIG. 2 is a lever diagram of the motor vehicle torsional vibration damper system of FIG. 1.

In the present example of FIG. 2, the transmission-drive system 10 includes the planetary gear set 40. The planetary gear set 40 includes three nodes: a first node "S" representing the sun gear 42, a second node "C" representing the carrier 52, and a third node "R" representing the ring gear 46. The second node "C" defines the input which is coupled to the lock-up clutch plate 36. The third node "R" is connected to the transmission input shaft 18. The third node "R" is also coupled to the carrier 52, and provides output to the transmission 68. The springs 62 are connected between the second node "C" and the third node "R". The inertial mass 74 is connected to the first node "S". With the distance between the second node "C" and the third node "R" defined as 1, and a distance between the second node "C" and the first node "S" defined as Ra, the effective inertia $I_{eff}$ is equal to $I \times (Ra+1)^2$.

Figure 3:
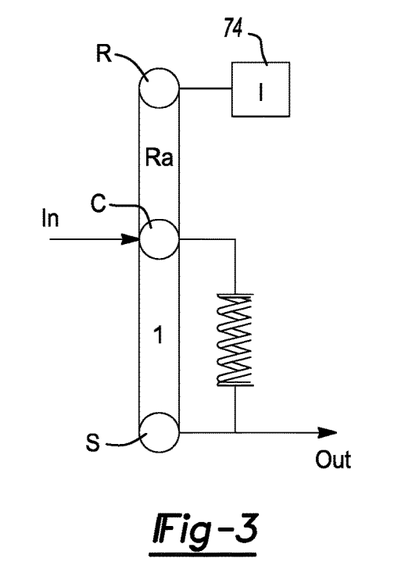
FIG. 3 is a lever diagram of a motor vehicle torsional vibration damper system modified from FIG. 2.

Referring to FIG. 3 and again to FIG. 2, a modified transmission-drive system includes the planetary gear set 40. The planetary gear set 40 again includes three nodes: the first node "S" representing the sun gear 42, a second node "C" representing the carrier 52, and a third node "R" representing the ring gear 46. The second node "C" again defines the input which is coupled to the lock-up clutch plate 36. The first node "S" is connected to the transmission input shaft 18. The first node "S" is also coupled to the carrier 52, and provides output to the transmission 68. The springs 62 are connected between the second node "C" and the first node "S". The inertial mass 74 is connected to the third node "R".

Referring to FIG. 4 and again to FIGS. 1 and 2, according to a further aspect, a modified transmission-drive system includes the planetary gear set 40. The planetary gear set 40 again includes three nodes: the first node "S" representing the sun gear 42, the second node "C" representing the carrier 52, and the third node "R" representing the ring gear 46. The third node "R" in this aspect defines the input which is coupled to the lock-up clutch plate 36. The second node "C" is connected to the transmission input shaft 18. The second node "C" is also coupled to the ring gear 46, and provides output to the transmission 68. The springs 62 are connected between the second node "C" and the third node "R". The inertial mass 74 is connected to the first node "S".

Figure 4:
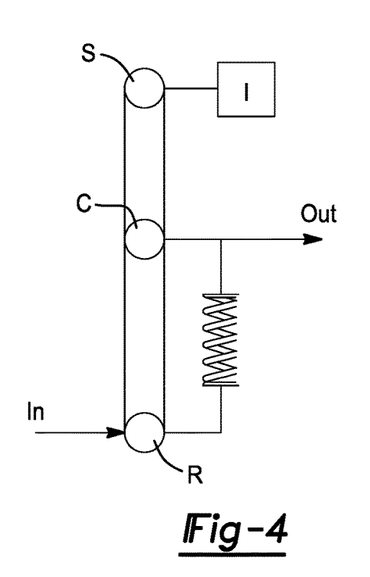
FIG. 4 is a lever diagram of the motor vehicle torsional vibration damper system modified from FIG. 2.
Figure 5:
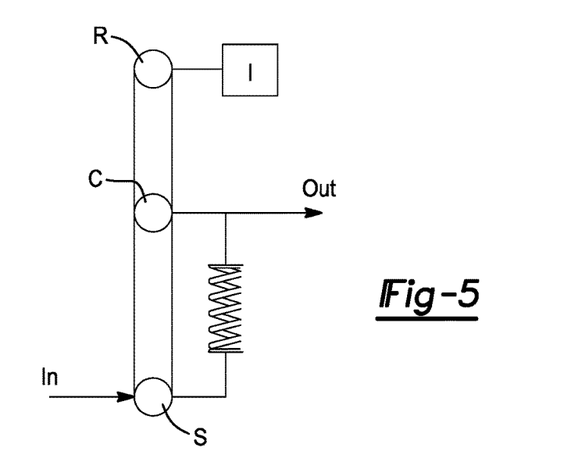
FIG. 5 is a lever diagram of the motor vehicle torsional vibration damper system modified from FIG. 2.

Referring to FIG. 5 and again to FIG. 4, according to a further aspect, a modified transmission-drive system includes the planetary gear set 40. The planetary gear set 40 again includes three nodes: the first node "S" representing the sun gear 42, the second node "C" representing the carrier 52, and the third node "R" representing the ring gear 46. The first node "S" in this aspect defines the input which is coupled to the lock-up clutch plate 36. The second node "C" is connected to the transmission input shaft 18. The second node "C" is also coupled to the sun gear 42, and provides output to the transmission 68. The springs 62 are connected between the second node "C" and the first node "S". The inertial mass 74 is connected to the third node "R". According to several aspects, and with continuing reference to FIGS. 1-5, equivalent connections can be made using a double pinion planetary gear set in lieu of the planetary gear set 40.

Figure 6:
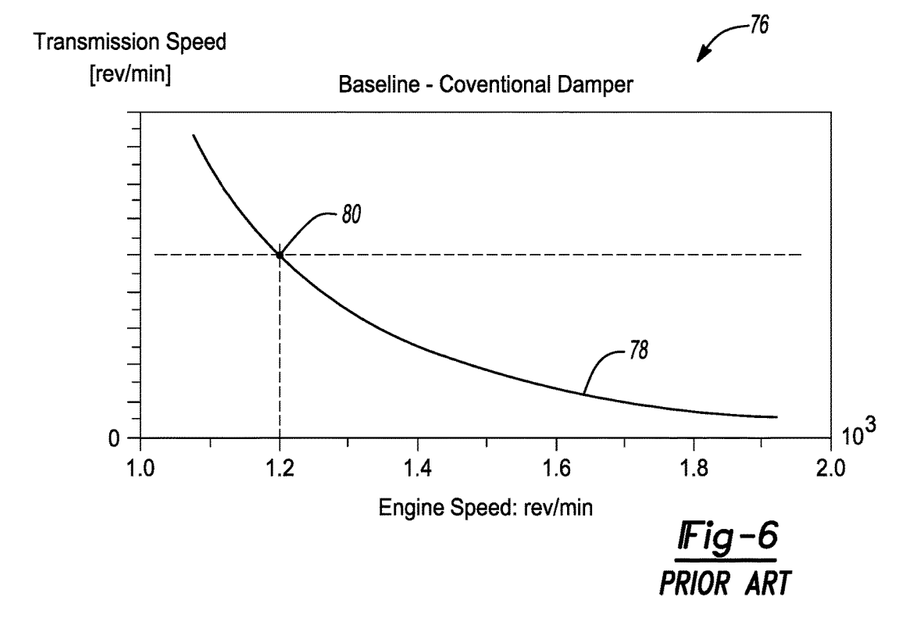
FIG. 6 is a graph presenting a prior art baseline engine torsional vibration during increasing engine rpm for a 4-cylinder engine.

Referring to FIG. 6, a graph 76 represents a baseline for the transmission-drive system 10 with a conventional damper and omits the planetary gear set, the inertial mass member 72, and the inertial mass 74. A curve 78 represents various torsional vibration rms values at steady torque with a 4-cylinder engine (approximately one half of the pistons of an 8-cylinder engine are firing) plotted as a function of engine speed in rpm. It is desirable to maintain curve 78 below a predetermined threshold for operator comfort to the maximum extent possible. As shown in FIG. 6, the curve 78 defines a crossover point 80 at approximately 1200 engine rpm. Above the engine rpm value of approximately 1200 rpm and therefore below a threshold the operator will "feel" negligible engine torsional vibration. It is desirable to lower the engine rpm value where the crossover point is present.

Figure 7:
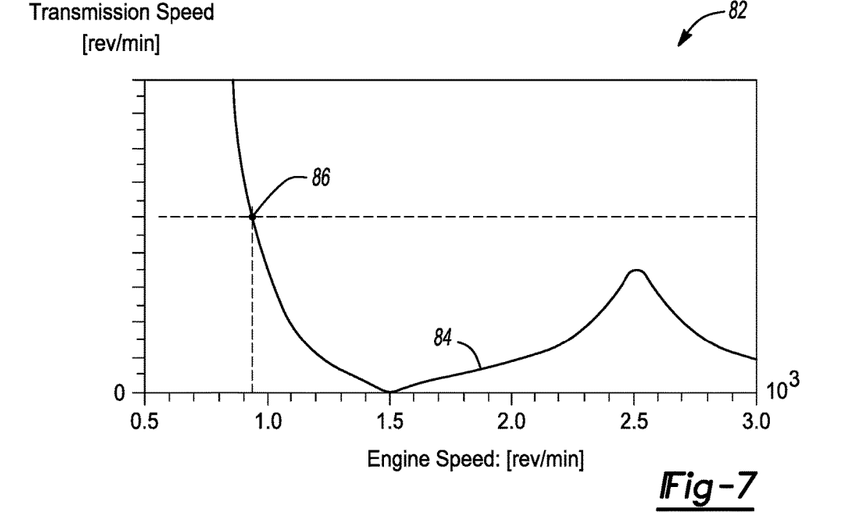
FIG. 7 is a graph presenting engine torsional vibration during increasing engine rpm for the 4-cylinder engine with the addition of the inertial mass member and inertial mass of the present disclosure.

Referring to FIG. 7 and again to FIG. 6, according to several aspects, a graph 82 represents the transmission-drive system 10 which includes the planetary gear set with the inertial mass member 72 and the inertial mass 74. A curve 84 represents various driveline torsional vibration rms values at steady torque for a 4-cylinder engine, plotted as a function of engine speed in rpm. As shown in FIG. 7, the curve 84 defines a crossover point 86 at approximately 920 engine rpm. The use of the planetary gear set in conjunction with the inertial mass member 72 and the inertial mass 74 in the torsional vibration damper 12 of the present disclosure reduces engine rpm at the crossover point from 1200 rpm (FIG. 6) to approximately 920 rpm (FIG. 7) thereby providing a broader range of engine operational rpm below the desired value.

Figure 8:
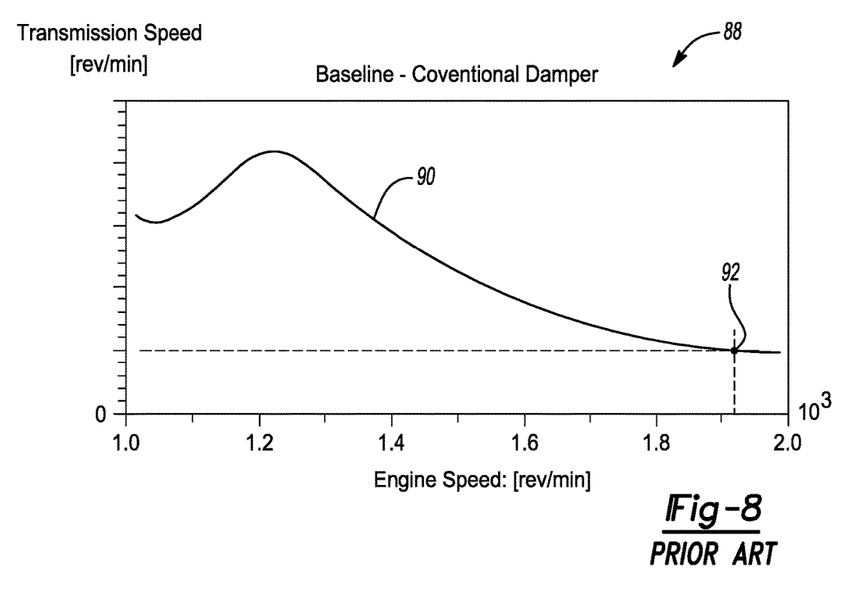
FIG. 8 is a graph presenting a prior art baseline engine torsional vibration during increasing engine rpm for a 2-cylinder engine.

Referring to FIG. 8, a graph 88 represents a baseline for the transmission-drive system 10 having a conventional system which omits the planetary gear set, the inertial mass member 72, and the inertial mass 74. A curve 90 represents various torsional vibration rms values at steady torque for a 2-cylinder engine, plotted as a function of engine speed in rpm. As previously noted, it is desirable to maintain curve 90 below a predetermined threshold for operator comfort to the maximum extent possible. As shown in FIG. 8, the curve 90 defines a crossover point 92 at approximately 1940 engine rpm. Above the engine rpm value of approximately 1940 rpm the operator will "feel" negligible engine torsional vibration. As noted in the FIG. 6 example above it is desirable to lower the engine rpm value where the crossover point is present.

Figure 9:
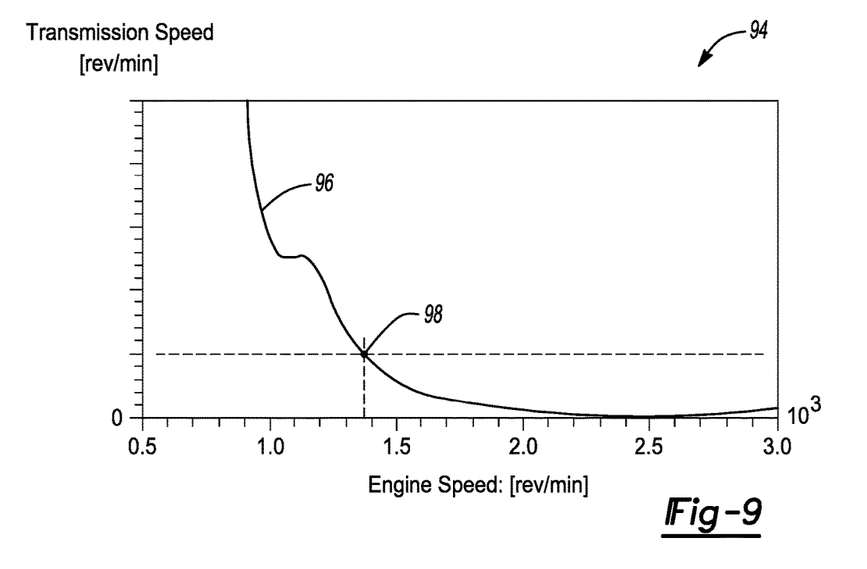
FIG. 9 is a graph presenting engine torsional vibration during increasing engine rpm for the 2-cylinder engine with the addition of the inertial mass member and inertial mass of the present disclosure.

Referring to FIG. 9 and again to FIG. 8, according to several aspects, a graph 94 represents the transmission-drive system 10 with the same 2-cylinder engine defined for FIG. 8, with the torsional vibration damper further including the planetary gear set, the inertial mass member 72, and the inertial mass 74. A curve 96 represents various torsional vibration rms values at steady torque with a 2-cylinder engine, plotted as a function of engine speed in rpm. As shown in FIG. 9, the curve 96 defines a crossover point 98 at approximately 1380 engine rpm. The addition of the planetary gear set, the inertial mass member 72, and the inertial mass 74 of the present disclosure at the same cylinder operation therefore reduces engine rpm at the crossover point from approximately 1940 rpm (FIG. 8) to approximately 1380 rpm (FIG. 9) thereby providing a broader range of engine operational rpm below the desired value.

It is well known that to achieve more effective torsional vibration isolation it is desirable to reduce the spring coefficient and provide a larger maximum angular displacement between an input member such as an input shaft and an output member such as an output shaft of the vibration isolator. Known torsional vibration dampers using springs to dampen torsional vibration are limited by the spring coefficient and packaging space, and therefore have a limited angular displacement of the isolator components. By the additional use of the planetary gear set 40 described herein, together with the use of the inertial mass member 72 and the inertial mass 74 both connected to the sun gear 42, a significant decrease in driveline torsional vibration amplitude is achieved and reduced driveline torsional vibration amplitude at a lower crossover operational rpm is achieved without the need for increasing the spring size for extra travel capability in the torsional vibration damper.

According to several aspects, a torsional vibration damper for a motor vehicle 10 includes a planetary gear set 12. The planetary gear set 12 includes a sun gear 42, a carrier 52 rotatably supporting multiple planet gears 44 individually meshed with the sun gear 42, and a ring gear 46 connected to a transmission input shaft 18 and meshed with the planet gears 44. A spring cage 54 includes: a first spring support member 56 having a member first leg 56a fixed to the ring gear 46; a member second leg 56b rotatably connected to the transmission input shaft 18; and multiple first spring support member elements 60a, 60b. A second spring support member 64 is connected to the carrier 52, the second spring support member 64 having multiple second spring support member elements 64a. Multiple springs 62 each have at least one of the first spring support member elements 60a, 60b and one of the second spring support member elements 64a in contact with opposed ends of the spring 62. An inertial mass member 72 is connected to the sun gear 42 at a first end 72a and has an inertial mass 74 connected at a second end 72b.

It should also be appreciated that the torsional vibrational damper 12 may have other configurations, such as having fewer or greater springs, springs of differing geometry, co-axial spring pairs, and modifications with respect to the quantity of planet gears of the planetary gear set 40 without departing from the scope of the present disclosure. The input, the output, and inertia connections can also be changed on the planetary gear set to obtain similar results.

The description of the invention is merely exemplary in nature and variations that do not depart from the general gist of the invention are intended to be within the scope of the invention. Such variations are not to be regarded as a departure from the spirit and scope of the invention.

What is claimed is:

1. A torsional vibration damper for a motor vehicle, comprising:
    a planetary gear set connected to a transmission input shaft, the planetary gear set including a first member, a second member, and a third member;
    a spring cage including:
        a first spring support member having multiple first spring support member elements;
        a second spring support member connected to the second member of the planetary gear set, the second spring support member having multiple second spring support member elements; and
        multiple springs, each spring having at least one of the first spring support member elements and one of the second spring support member elements in contact with each opposite end of the springs; and
    an inertial mass member connected to the first member of the planetary gear set.

2. The torsional vibration damper for a motor vehicle of claim 1, wherein the first spring support member includes a member first leg fixed to the third member of the planetary gear set.

3. The torsional vibration damper for a motor vehicle of claim 2, wherein the first spring support member includes a member second leg rotatably connected to the transmission input shaft.

4. The torsional vibration damper for a motor vehicle of claim 3, wherein the inertial mass member is connected to the first member at a first end and includes an inertial mass connected at a second end, the inertial mass member and the inertial mass positioned between the member first leg and the member second leg of the first spring support member.

5. The torsional vibration damper for a motor vehicle of claim 3, wherein the inertial mass member is connected to the first member at a first end and includes an inertial mass connected at a second end, and wherein the inertial mass member and the inertial mass are positioned between the member second leg of the first spring support member and the second spring support member.

6. The torsional vibration damper for a motor vehicle of claim 1, wherein the first member of the planetary gear set defines a sun gear, the second member of the planetary gear set defines a carrier, and the third member of the planetary gear set defines a ring gear, and the inertial mass is spaced freely away from the sun gear at a distance maximized from a longitudinal central axis of the transmission input shaft.

7. The torsional vibration damper for a motor vehicle of claim 6, wherein:
    the carrier is connected to the transmission input shaft; and
    the carrier is also coupled to the ring gear.

8. The torsional vibration damper for a motor vehicle of claim 6, wherein:
    the ring gear is connected to the transmission input shaft; and
    the ring gear is also coupled to the carrier.

9. The torsional vibration damper for a motor vehicle of claim 6, wherein the ring gear and the first spring support member rotate with respect to the transmission input shaft and the planetary gear set, and the ring gear is restrained in an arc of rotation with respect to the second spring support member by compression and expansion of the springs.

10. The torsional vibration damper for a motor vehicle of claim 1, wherein the inertial mass member is connected to the first member at a first end and includes an inertial mass connected at a second end, and wherein the second end of the inertial mass member and the inertial mass are positioned proximate to the springs.

11. The torsional vibration damper for a motor vehicle of claim 10, wherein the first member of the planetary gear set defines a ring gear, the second member of the planetary gear set defines a carrier, and the third member of the planetary gear set defines a sun gear.

12. The torsional vibration damper for a motor vehicle of claim 11, wherein:
the carrier is connected to the transmission input shaft; and
the carrier is also coupled to the sun gear.

13. The torsional vibration damper for a motor vehicle of claim 11, wherein:
the sun gear is connected to the transmission input shaft; and
the carrier is also coupled to the sun gear.

14. A torsional vibration damper for a motor vehicle, comprising:
a planetary gear set, the planetary gear set including a sun gear, a carrier rotatably supporting multiple planet gears individually meshed with the sun gear, and a ring gear connected to a transmission input shaft and meshed with the planet gears; and
a spring cage including:
a first spring support member having:
a member first leg fixed to the ring gear;
a member second leg rotatably connected to the transmission input shaft; and
multiple first spring support member elements;
a second spring support member connected to the carrier, the second spring support member having multiple second spring support member elements; and
multiple springs each spring having at least one of the first spring support member elements and one of the second spring support member elements in contact with opposed ends of the spring; and
an inertial mass member connected to the sun gear at a first end and having an inertial mass connected at a second end.

15. The torsional vibration damper for a motor vehicle of claim 14, wherein the inertial mass member is positioned between the member second leg of the first spring support member and the second spring support member, and the inertial mass is positioned proximate to the springs.

16. The torsional vibration damper for a motor vehicle of claim 14, wherein the ring gear and the first spring support member rotate with respect to the transmission input shaft.

17. The torsional vibration damper for a motor vehicle of claim 14, wherein the ring gear is restrained in an arc of rotation with respect to the second spring support member by compression and expansion of the springs.

18. The torsional vibration damper for a motor vehicle of claim 14, wherein:
the ring gear is connected to the transmission input shaft; and
the ring gear is also coupled to the carrier.

19. The torsional vibration damper for a motor vehicle of claim 14, wherein the inertial mass member and the inertial mass are positioned between the member first leg and the member second leg of the first spring support member.

20. A powertrain for a motor vehicle comprising:
an engine disposed in the motor vehicle and having an engine output member connected to a flex plate;
an automatic transmission connected to the engine having a transmission input shaft;
a torque converter connected to the transmission input shaft of the automatic transmission; and
a torsional vibration damper connected between the engine output member and the transmission input shaft, the torsional vibration damper including:
a planetary gear set, the planetary gear set including a sun gear, a carrier rotatably supporting multiple planet gears individually meshed with the sun gear, and a ring gear connected to the transmission input shaft and meshed with the planet gears; and
a spring cage including:
a first spring support member having:
a member first leg fixed to the ring gear;
a member second leg rotatably connected to the transmission input shaft; and
multiple first spring support member elements;
a second spring support member connected to the carrier, the second spring support member having multiple second spring support member elements; and
multiple springs each spring having at least one of the first spring support member elements and one of the second spring support member elements in contact with opposed ends of the spring; and
an inertial mass member connected to the sun gear at a first end and having an inertial mass connected at a second end, the inertial mass member and the inertial mass positioned within a space envelope between the member first leg and the member second leg.

* * * * *